United States Patent
Chang (10) Patent No.: US 9,174,285 B2
(45) Date of Patent: Nov. 3, 2015

(54) POSITIONING SLEEVE ASSEMBLY ADAPTED FOR ENGAGING WITH DIFFERENT TOOL PARTS

(71) Applicant: Chi-Hsiung Chang, Taichung (TW)

(72) Inventor: Chi-Hsiung Chang, Taichung (TW)

(*) Notice: Subject to any disclaimer, the term of this patent is extended or adjusted under 35 U.S.C. 154(b) by 237 days.

(21) Appl. No.: 13/958,568

(22) Filed: Aug. 4, 2013

(65) Prior Publication Data

US 2015/0037111 A1    Feb. 5, 2015

(51) Int. Cl.
*B23B 31/107* (2006.01)
*B23B 51/12* (2006.01)
*B25B 23/00* (2006.01)
*B25B 15/00* (2006.01)
*B23B 49/00* (2006.01)

(52) U.S. Cl.
CPC ............. *B23B 51/12* (2013.01); *B23B 31/1071* (2013.01); *B23B 31/1075* (2013.01); *B23B 49/005* (2013.01); *B25B 15/001* (2013.01); *B25B 23/0035* (2013.01); *B25B 23/0064* (2013.01); *B23B 2231/04* (2013.01); *Y10T 279/17752* (2015.01); *Y10T 408/8925* (2015.01)

(58) Field of Classification Search
CPC ............. B23B 31/107; B23B 31/1071; Y10T 279/17743; Y10T 279/17752; Y10T 279/17811
USPC ................. 279/74, 75, 82, 904, 905; 408/202
See application file for complete search history.

(56) References Cited

U.S. PATENT DOCUMENTS

| | | | | |
|---|---|---|---|---|
| 4,753,142 A * | 6/1988 | Hornung | .......................... | 81/429 |
| 5,182,973 A * | 2/1993 | Martindell | ....................... | 81/429 |
| 5,996,452 A * | 12/1999 | Chiang | ............................ | 81/429 |
| 7,565,854 B2 * | 7/2009 | Chiang et al. | .................... | 81/467 |
| 2006/0163823 A1 * | 7/2006 | Shu | ................................. | 279/75 |

* cited by examiner

*Primary Examiner* — Daniel Howell
*Assistant Examiner* — Yasir Diab
(74) *Attorney, Agent, or Firm* — Patent Office of Bang Shia (57) ABSTRACT

A positioning sleeve assembly adapted for engaging with drill bit holder or screwdriver bit is provided with a sleeve and an engaging device. The engaging device includes a drive shaft at one end and an inserting hole at another end. The engaging device is inserted in the sleeve with the drive shaft located one end of the sleeve, and the inserting hole at the other end of the sleeve. The inserting hole at one end of the engaging device is suitable for both engaging with a drill bit holder and a screwdriver bit, so that a single positioning sleeve assembly of the present invention is capable of selectively connecting drill bit and screwdriver bit.

6 Claims, 7 Drawing Sheets

POSITIONING SLEEVE ASSEMBLY ADAPTED FOR ENGAGING WITH DIFFERENT TOOL PARTS

BACKGROUND OF THE INVENTION

1. Field of the Invention

The present invention relates to a tool part used in an electric tool, and more particularly to a positioning sleeve assembly adapted for engaging with different tool parts.

2. Description of the Prior Art

Electric drill is commonly used in machine industry and in construction and decoration field as a tool for drilling, screwing and unscrewing. At a working end of the electric drill is connected different sized or types of drill bit or screwdriver bit to perform different jobs.

Nowadays, some drill bits or screwdriver bits with depth restricting design has been designed and developed to effectively control working depth, and some drill or screwdriver bits are capable of idly rotating in case of excessive load.

Most of the drill or screwdriver bits with working depth control or idle rotation design are integrally formed with a connecting sleeve which is to be connected to and rotated by an electric tool. Since the drill or screwdriver bit is unitary with the connecting sleeve, the drill bit and the screwdriver bit must be manufactured with different moulds, and therefore manufacturing cost is relatively high.

The present invention has arisen to mitigate and/or obviate the afore-described disadvantages.

SUMMARY OF THE INVENTION

The primary objective of the present invention is to provide a positioning sleeve assembly adapted for engaging with different tool parts, namely, a single positioning sleeve assembly is capable of selectively connecting drill bit or screwdriver bit.

To achieve the above objective, a positioning sleeve assembly adapted for engaging with different tool parts in accordance with the present invention is provided, the tool parts include drill bit holder or screwdriver bit, the positioning sleeve assembly comprises: a sleeve formed with a receiving hole which has a first opening and a second opening formed at both ends of the sleeve, in the receiving hole being formed an inner annular groove, and an engaging cavity extends inward from the first opening and is in communication with the receiving hole; a positioning device including a stationary end abutted against the second opening, and a restricting end, inside the stationary member and adjacent to the stationary end being formed an annular stop rib; and an engaging device being provided at one end thereof with a drive shaft which is hexagonal in cross section, another end of the engaging device being formed with an inserting hole, the engaging device being inserted in the receiving hole in such a manner that the drive shaft is located at the first opening, and the another end of the engaging device formed with the inserting hole is located at the second opening and received within the positioning device, the engaging device being further provided at two ends thereof with a first fixing groove and a second fixing groove, respectively, a first clamping ring being engaged in the first fixing groove, and a second clamping ring being engaged in the second fixing groove in such a manner that the first clamping ring is stopped against the first opening of the sleeve, and the second clamping ring is stopped against the annular stop rib of the positioning device, the engaging device being further provided with a plurality of round holes which are in communication with the inserting hole, and in each of the round holes being disposed a steel ball, the tool parts being inserted in the inserting hole, and in the inserting hole being formed a third fixing groove for holding a third clamping ring which is used to fix the tool part.

The present invention is characterized in that: the inserting hole at one end of the engaging device is suitable for both engaging with a drill bit holder and a screwdriver bit, so that a single positioning sleeve assembly of the present invention is capable of selectively connecting drill bit and screwdriver bit.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
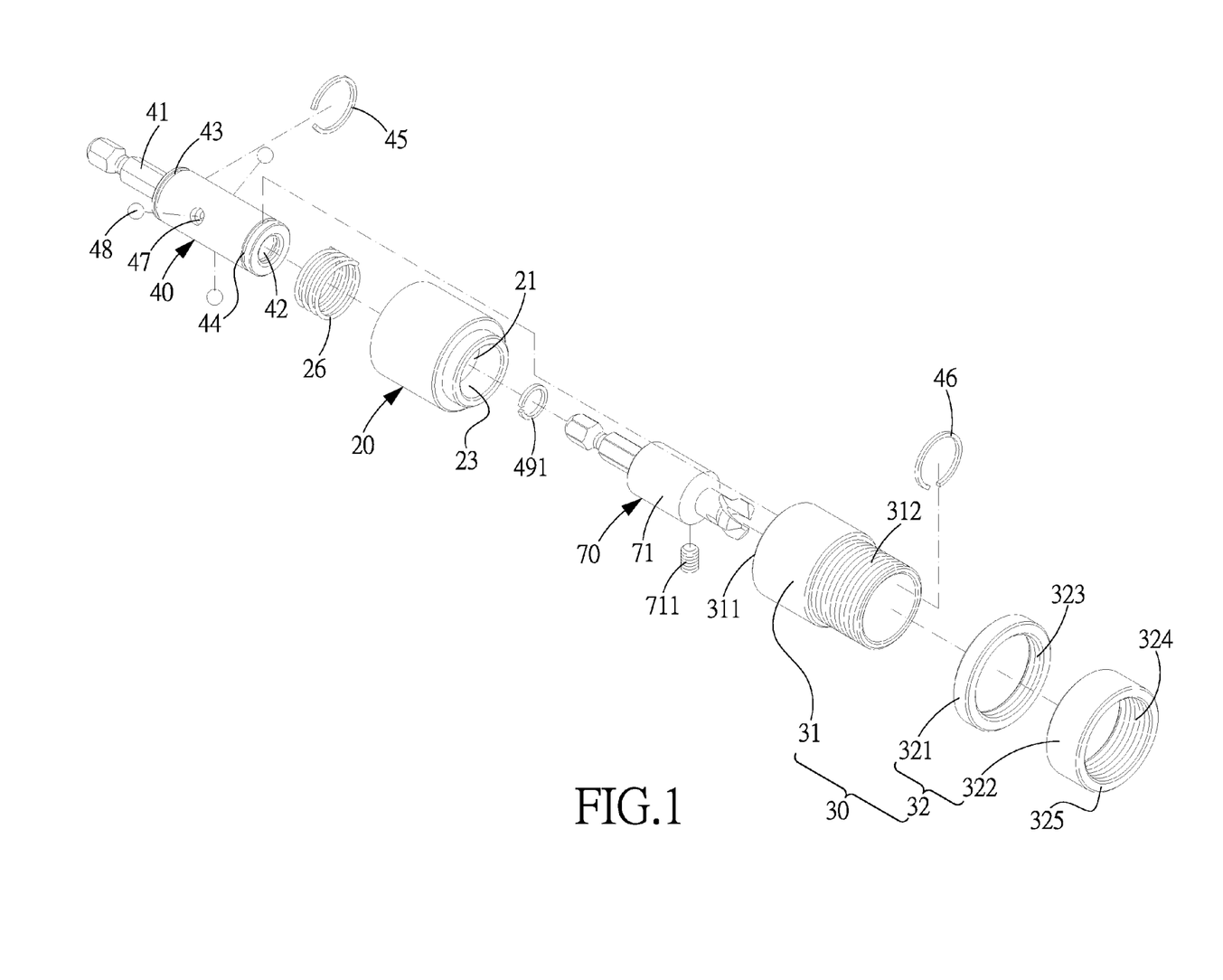
FIG. 1 is an exploded view of a positioning sleeve assembly adapted for engaging with different tool parts in accordance with a first preferred embodiment of the present invention.
Figure 2:
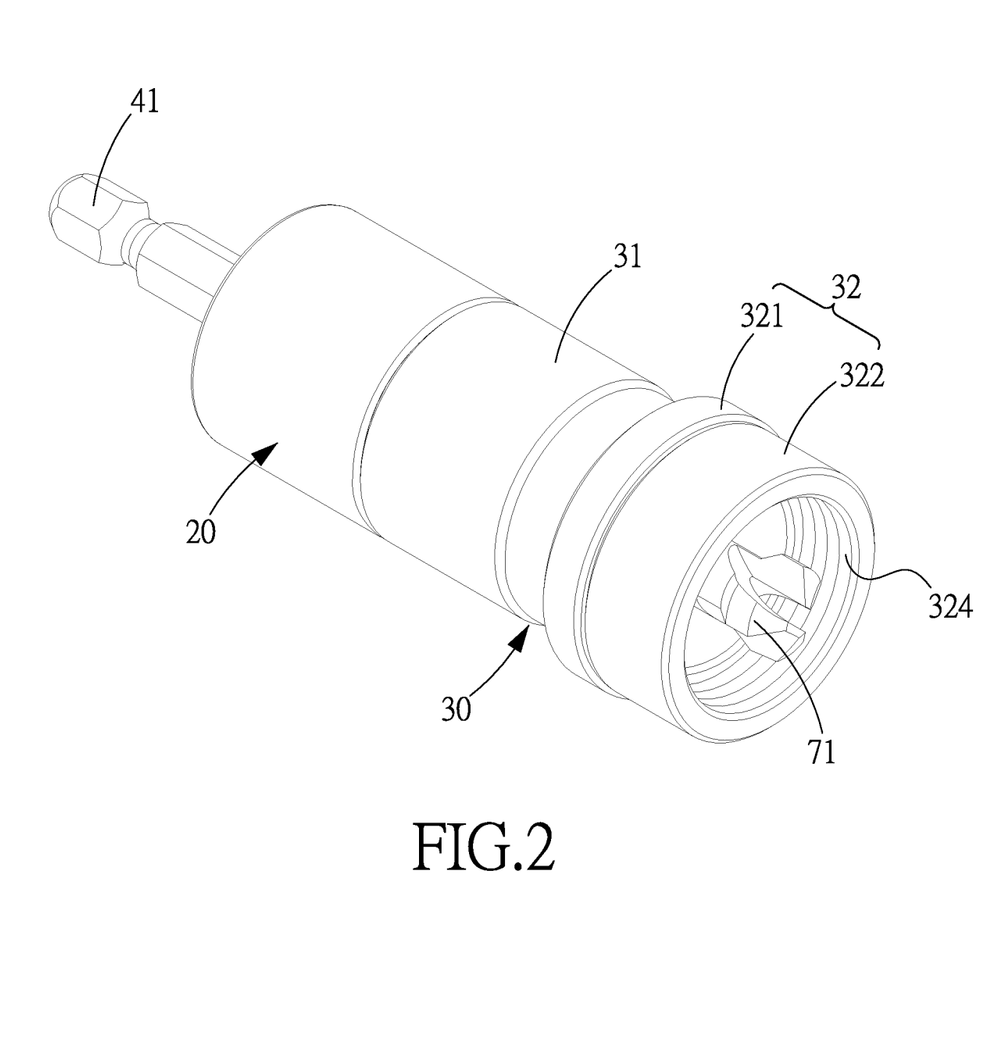
FIG. 2 is an assembly view of the positioning sleeve assembly in accordance with the first preferred embodiment of the present invention.
Figure 3:
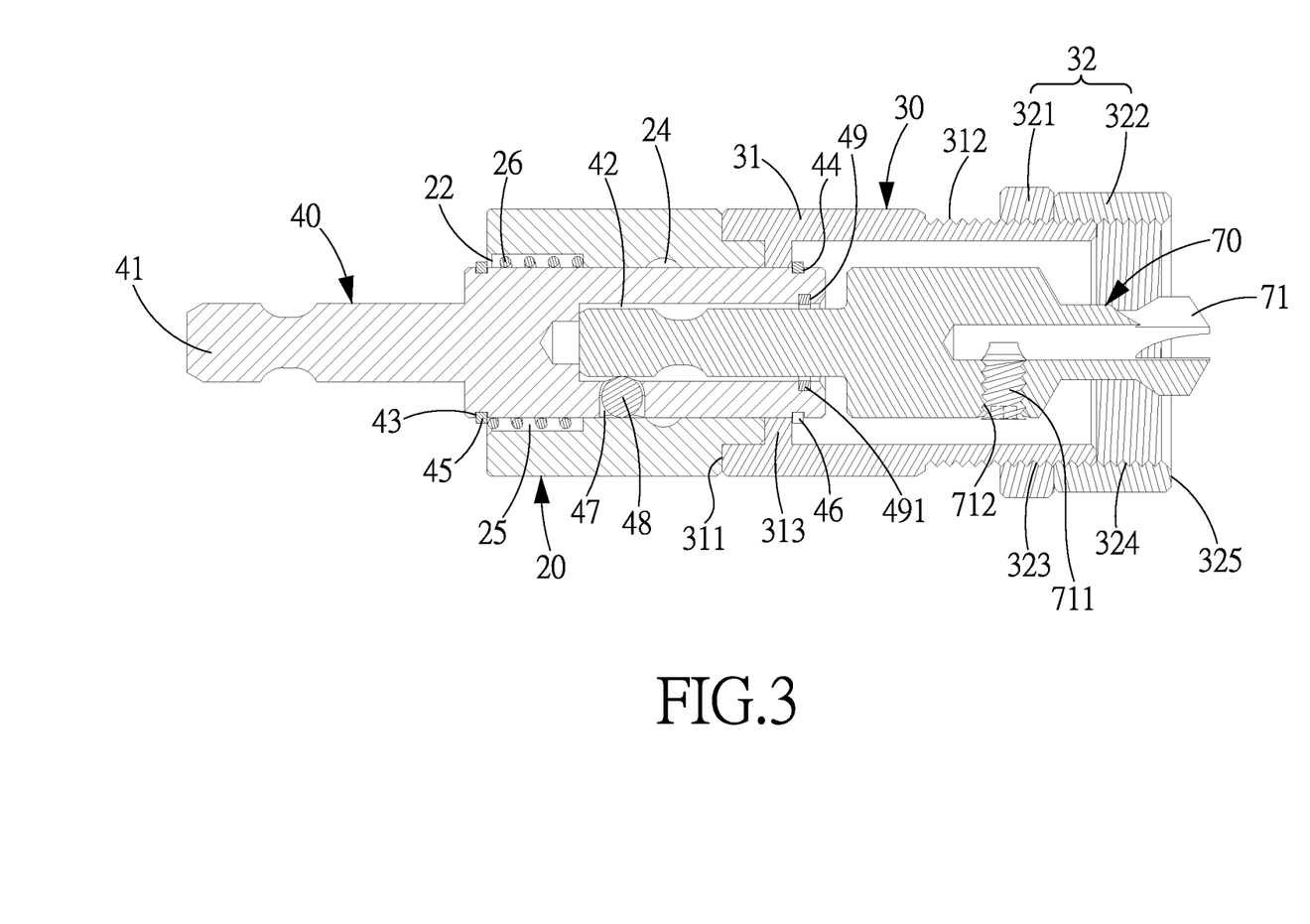
FIG. 3 is a cross sectional view of the positioning sleeve assembly in accordance with the first preferred embodiment of the present invention.

Referring to FIGS. 1-3, a positioning sleeve assembly adapted for engaging with different tool parts 70 in accordance with a first preferred embodiment of the present invention is shown, wherein the tool parts 70 can be a drill bit holder 71 or a screwdriver bit 72. The drill bit holder 71 is formed with a fixing hole 712, and an inner screw 711 is screwed through the fixing hole 712 to fix a drill bit (not shown). The positioning sleeve assembly is driven to rotate by an electric tool and comprises: a sleeve 20, a positioning device 30 and an engaging device 40.

The sleeve 20 is formed with a receiving hole 21 which has a first opening 22 and a second opening 23 formed at both ends of the sleeve 20. In the receiving hole 21 is formed an inner annular groove 24, and an engaging cavity 25 extends inward from the first opening 22 and is in communication with the receiving hole 21. In the engaging cavity 25 is disposed an elastic member 26 which is a spring with one end abutted against the bottom of the engaging cavity 25.

The positioning device 30 includes a stationary member 31 and an adjustment member 32. The stationary member 31 has a stationary end 311 abutted against the second opening 23, and another end of the stationary member 31 is formed with an outer threaded portion 312. Inside the stationary member 31 and adjacent to the stationary end 311 is formed an annular stop rib 313. The end of the sleeve 20 formed with the second opening 23 is engaged in the stationary end 311 of the stationary member 31 and stopped against the annular stop rib 313. The adjustment member 32 includes a first adjustment portion 321 and a second adjustment portion 322 which are each provided with an inner threaded portion 323, 324 to be screwed on the outer threaded portion 312 of the stationary member 31, respectively. The first adjustment portion 321 is located at the adjacent to the second opening 23. The inner threaded portion 323 of the first adjustment portion 321 and the inner threaded portion 324 of the second adjustment portion 322 have opposite threads, and at one end of the second adjustment portion 322 is a restricting end 325.

The engaging device 40 is provided at one end thereof with a drive shaft 41 which is hexagonal in cross section and to be engaged with and rotated by an electric tool. Another end of the engaging device 40 is formed with an inserting hole 42. The engaging device 40 is inserted in the receiving hole 21 and the elastic member 26 in such a manner that the drive shaft 41 is located at the first opening 22, the another end of the engaging device 40 formed with the inserting hole 42 is located at the second opening 23 and received within the positioning device 30. The engaging device 40 is further provided at the two ends thereof with a first fixing groove 43 and a second fixing groove 44, respectively. A first clamping ring 45 is engaged in the first fixing groove 43, and a second clamping ring 46 is engaged in the second fixing groove 44 in such a manner that the first clamping ring 45 is stopped against the first opening 22 of the sleeve 20, another end of the elastic member 26 is abutted against the first clamping ring 45, and the second clamping ring 46 is stopped against the annular stop rib 313 of the positioning device 30. The engaging device 40 is further provided with a plurality of equidistantly spaced round holes 47 which are in communication with the inserting hole 42, and in each of the round holes 47 is disposed a steel ball 48. The tool part 70 is inserted in the inserting hole 42, and in the inserting hole 42 is formed a third fixing groove 49 for holding a third clamping ring 491 which is used to fix the tool part 70. In this embodiment, the first, second and third clamping rings 45, 46 and 491 are a C-ring.

Figure 4:
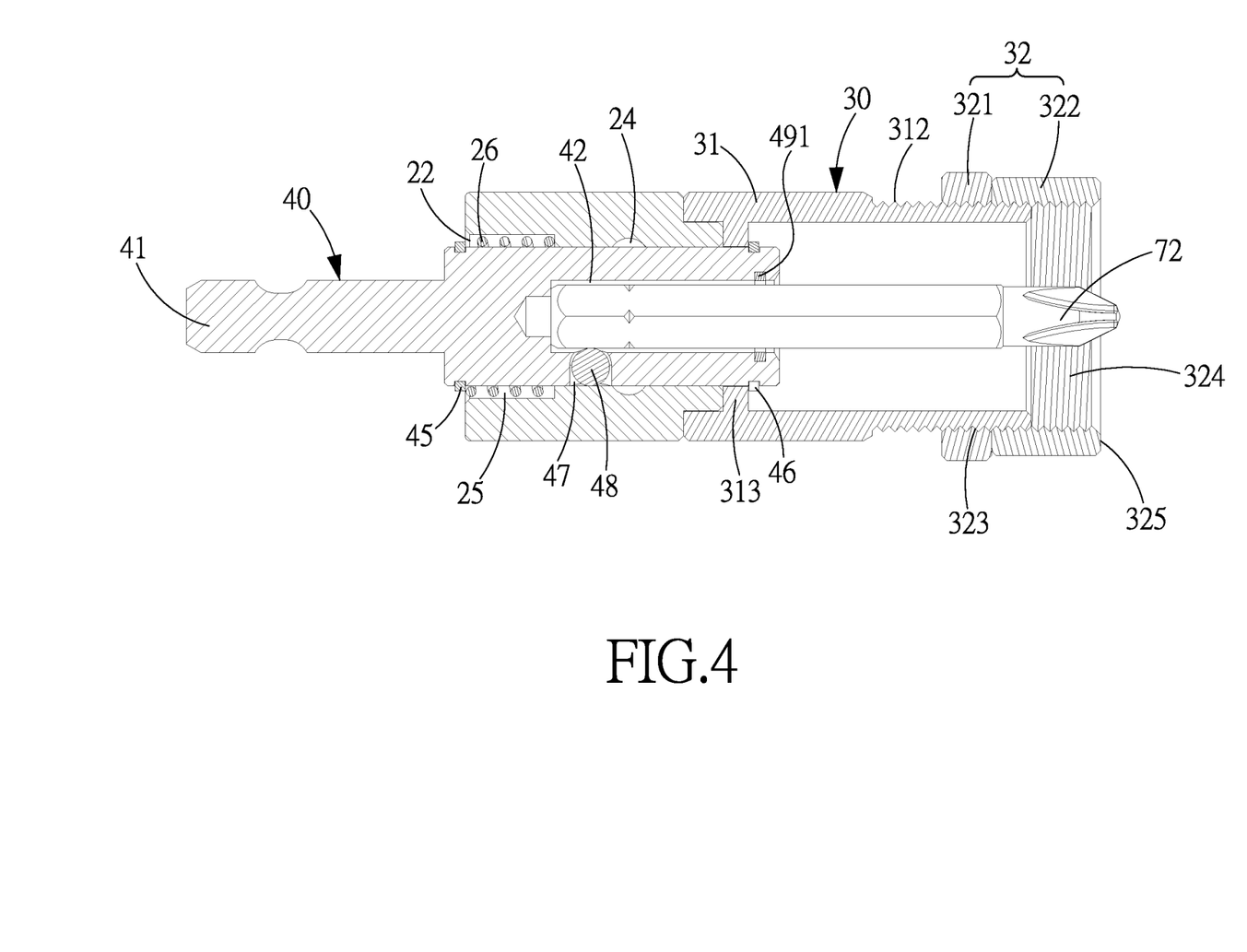
FIG. 4 is another cross sectional view showing the positioning sleeve assembly in accordance with the first preferred embodiment of the present invention is connected with a screwdriver bit.

As shown in FIGS. 3 and 4, with the adjustment member 32, the present invention is capable of controlling the working depth. Since the inner threaded portion 323 of the first adjustment portion 321 and the inner threaded portion 324 of the second adjustment portion 322 have opposite threads, it can prevent undesired rotation or impact-caused displacement of the adjustment member 32. In addition, the arrangement of the inner annular groove 24 of the sleeve 20, and the round holes 47 and steel balls 48 of the engaging device 40 provides a clutch function to the positioning sleeve assembly of the present invention, and allows for idle rotation, which improves the convenience of use.

It is to be noted that the inserting hole 42 can be selectively engaged with a drill bit holder 71, as shown in FIG. 3, so that a drill bit (not shown) can be used, or engaged with a screwdriver bit 72, as shown in FIG. 4.

Figure 5:
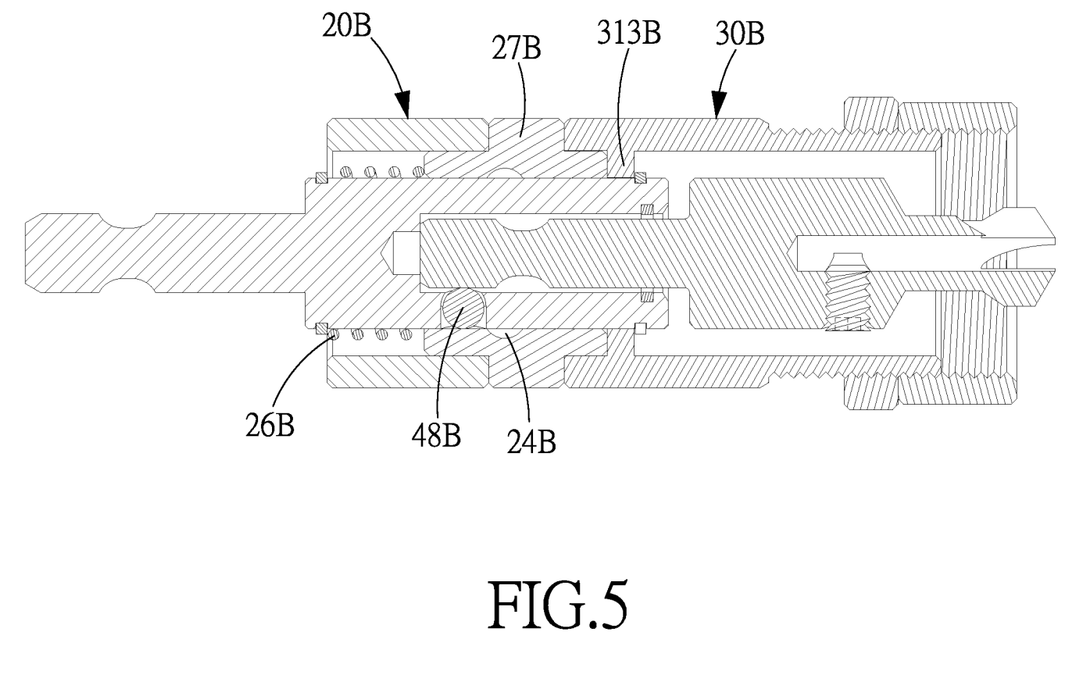
FIG. 5 is a cross sectional view of a positioning sleeve assembly in accordance with a second preferred embodiment of the present invention.

Referring then to FIG. 5, a positioning sleeve assembly 30B in accordance with a second preferred embodiment of the present invention is shown, wherein the sleeve 20B further comprises a protection bush 27B which is made of the same material as the steel ball 48B and located within the sleeve 20B, and the protection bush 27B has one end abutted against the elastic member 26B and another end abutted against the annular stop rib 313B. The inner annular groove 24B is formed on the inner surface of the protection bush 27B. Since the protection bush 27B and the steel balls 48B are made of the same material, repeated and long time of friction won't cause damage to the protection bush 27B when the steel balls 48B slide on the protection bush 27B, especially on the inner annular groove 24B, which extends the service life of the positioning sleeve assembly.

Figure 6:
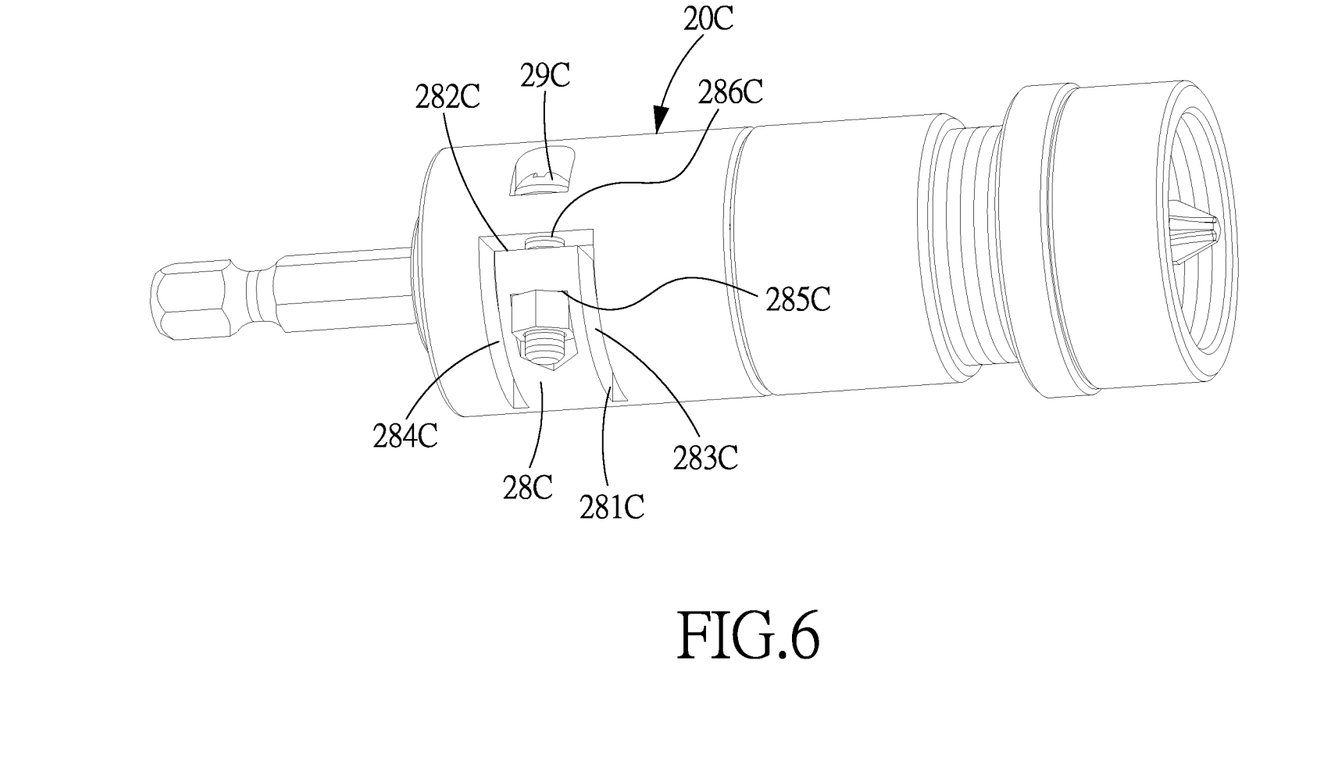
FIG. 6 is an assembly view of the positioning sleeve assembly in accordance with a third preferred embodiment of the present invention.
Figure 7:
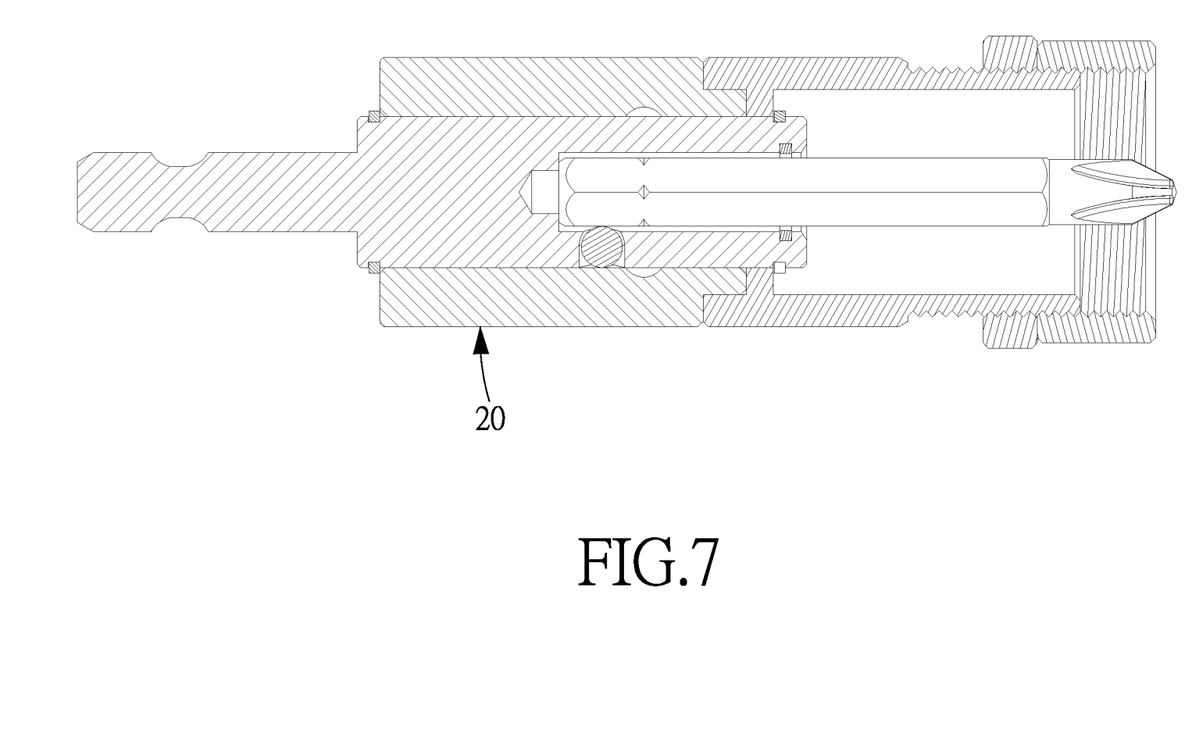
FIG. 7 is a cross sectional view of the positioning sleeve assembly in accordance with the third preferred embodiment of the present invention.

Referring then to FIGS. 6 and 7, a positioning sleeve assembly in accordance with a third preferred embodiment of the present invention is shown, wherein the sleeve 20C further comprises an arc-shaped piece 28C formed on an outer surface of the sleeve 20C, and a locking member 29C. The arc-shaped piece 28C has a fixing end 281C connected to the sleeve 20C, a connecting end 282C opposite to the fixing end 281C, and two lateral sides 283C located between the connecting end 282C and the fixing end 281C. The connecting end 282C and the two lateral sides 283C are separated by a slit 284C from the sleeve 20C. At the connecting end 282C is formed a through hole 285c, and on the outer surface of the sleeve 20C is formed an aperture 286c which is in aligned to and in communication with the through hole 285C, the locking member 29C is inserted and screwed between the through hole 285C and the aperture 286C.

While we have shown and described various embodiments in accordance with the present invention, it is clear to those skilled in the art that further embodiments may be made without departing from the scope of the present invention.

What is claimed is:

1. A positioning sleeve assembly adapted for engaging with different tool parts, the tool parts including drill bit holder or screwdriver bit, the positioning sleeve assembly comprising:
   a sleeve formed with a receiving hole which has a first opening and a second opening formed at both ends of the sleeve, in the receiving hole being formed an inner annular groove, and an engaging cavity extends inward from the first opening and is in communication with the receiving hole;
   a positioning device including a stationary end abutted against the second opening, and a restricting end, an annular stop rib being formed on an inner surface of a stationary member and located adjacent to the stationary end; and
   an engaging device being provided at one end thereof with a drive shaft which is hexagonal in cross section, another end of the engaging device being formed with an inserting hole, the engaging device being inserted in the receiving hole in such a manner that the drive shaft is located at the first opening, and the another end of the engaging device formed with the inserting hole is located at the second opening and received within the positioning device, the engaging device being further provided at two ends thereof with a first fixing groove and a second fixing groove, respectively, a first clamping ring being engaged in the first fixing groove, and a second clamping ring being engaged in the second fixing groove in such a manner that the first clamping ring is stopped against the first opening of the sleeve, and the second clamping ring is stopped against the annular stop rib of the positioning device, the engaging device being further provided with a plurality of round holes which are in communication with the inserting hole, and in each of the round holes being disposed a steel ball, the tool parts being inserted in the inserting hole, and in the inserting hole being formed a third fixing groove for holding a third clamping ring which is used to fix the tool part.

2. The positioning sleeve assembly adapted for engaging with different tool parts as claimed in claim 1, wherein the positioning device includes the stationary member and an adjustment member, the stationary member has a stationary end abutted against the second opening, and another end of the stationary member is formed with an outer threaded portion, inside the adjustment member is provided with an inner threaded portion to be screwed on the outer threaded portion of the stationary member.

3. The positioning sleeve assembly adapted for engaging with different tool parts as claimed in claim 2, wherein the adjustment member includes a first adjustment portion and a second adjustment portion which have opposite threads.

4. The positioning sleeve assembly adapted for engaging with different tool parts as claimed in claim 1, wherein the sleeve is provided with an engaging cavity which extends inward from the first opening, in the engaging cavity is disposed an elastic member which is sleeved on the engaging device and has two ends abutted against a bottom of the engaging cavity and the first clamping ring, respectively.

5. The positioning sleeve assembly adapted for engaging with different tool parts as claimed in claim 4, wherein the sleeve further comprises a protection bush which is made of the same material as the steel ball and located within the sleeve, and the protection bush has one end abutted against the elastic member and another end abutted against the annular stop rib.

6. The positioning sleeve assembly adapted for engaging with different tool parts as claimed in claim 1, wherein the sleeve further comprises an arc-shaped piece formed on an outer surface of the sleeve, and a locking member, the arc-shaped piece has a fixing end connected to the sleeve, a connecting end opposite to the fixing end, and two lateral sides located between the connecting end and the fixing end, the connecting end and the two lateral sides are separated by a slit from the sleeve, at the connecting end is formed a through hole, and on the outer surface of the sleeve is formed an aperture which is in aligned to and in communication with the through hole, the locking member is inserted and screwed between the through hole and the aperture.

* * * * *